US007731881B2

(12) United States Patent
Dean et al.

(10) Patent No.: US 7,731,881 B2
(45) Date of Patent: Jun. 8, 2010

(54) METHOD FOR MAKING FOG RESISTANT THERMOPLASTIC ARTICLES AND ARTICLES MADE THEREFROM

(75) Inventors: Jennifer Dean, Eindhoven (NL); Theodorus Lambertus Hoeks, Bergon op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 384 days.

(21) Appl. No.: 10/749,071

(22) Filed: Dec. 30, 2003

(65) Prior Publication Data
US 2005/0140051 A1 Jun. 30, 2005

(51) Int. Cl.
*B28B 11/00* (2006.01)
*C09K 3/18* (2006.01)
(52) U.S. Cl. .................. 264/232; 264/233; 264/241; 264/319; 264/320; 264/340; 106/13
(58) Field of Classification Search ................. None
See application file for complete search history.

(56) References Cited

U.S. PATENT DOCUMENTS

| | | | | |
|---|---|---|---|---|
| 3,048,263 | A * | 8/1962 | Sacks et al. ............. | 426/129 |
| 3,169,121 | A | 2/1965 | Goldberg ................. | 260/47 |
| 3,433,653 | A * | 3/1969 | van der Smissen ....... | 106/13 |
| 3,635,895 | A | 1/1972 | Kramer ............... | 260/47 XA |
| 3,720,652 | A * | 3/1973 | Yagi et al. ............... | 524/249 |
| 3,766,299 | A | 10/1973 | Dornte ................... | 260/874 |
| 3,891,719 | A * | 6/1975 | Schirmer et al. .......... | 525/67 |
| 3,933,407 | A * | 1/1976 | Tu et al. ................ | 359/507 |
| 4,001,184 | A | 1/1977 | Scott .................. | 260/47 XA |
| 4,450,249 | A | 5/1984 | Schmidt et al. | |
| 4,487,896 | A | 12/1984 | Mark et al. ............. | 525/439 |
| 4,690,688 | A | 9/1987 | Adams et al. ............ | 44/76 |
| 4,943,380 | A | 7/1990 | Sugiur et al. ............ | 252/8.7 |
| 4,983,648 | A * | 1/1991 | Laughner et al. ......... | 523/351 |
| 5,002,825 | A * | 3/1991 | Mimura et al. ......... | 428/315.5 |
| 5,071,884 | A | 12/1991 | Malone | |
| 5,187,214 | A * | 2/1993 | Govindan ............... | 524/157 |
| 5,306,801 | A * | 4/1994 | Sakashita et al. ......... | 528/198 |
| 5,316,825 | A * | 5/1994 | Nakai et al. ............. | 428/156 |
| 5,322,882 | A | 6/1994 | Okamoto ............... | 524/265 |
| 5,376,715 | A | 12/1994 | Fennhoff et al. ......... | 524/265 |
| 5,487,920 | A * | 1/1996 | Lopata et al. ............ | 427/489 |
| 5,852,098 | A | 8/1996 | Kohler et al. ............ | 524/494 |
| 5,620,485 | A | 4/1997 | Fey ...................... | 44/320 |
| 5,877,254 | A * | 3/1999 | La Casse et al. ......... | 524/590 |
| 5,910,540 | A * | 6/1999 | Takahashi ............. | 525/92 B |
| 6,040,053 | A * | 3/2000 | Scholz et al. ........... | 428/412 |
| 6,056,900 | A | 5/2000 | Shimizu et al. .......... | 264/2.6 |
| 6,090,907 | A | 7/2000 | Saito et al. .............. | 528/198 |
| 6,133,370 | A | 10/2000 | Gutek et al. ............. | 524/588 |
| 6,187,888 | B1 | 2/2001 | Shimizu et al. .......... | 526/314 |
| 6,187,896 | B1 * | 2/2001 | Nakajima et al. ......... | 528/198 |
| 6,194,497 | B1 | 2/2001 | Willems et al. .......... | 524/165 |
| 6,225,391 | B1 * | 5/2001 | Parthasarathy et al. .... | 524/269 |
| 6,677,014 | B1 * | 1/2004 | Edlein et al. ............ | 428/35.7 |
| 6,740,413 | B2 | 5/2004 | Klun et al. | |
| 6,797,383 | B2 * | 9/2004 | Nishizawa et al. ........ | 428/412 |
| 6,923,997 | B2 * | 8/2005 | Patchen ................. | 427/161 |
| 7,008,979 | B2 * | 3/2006 | Schottman et al. ........ | 523/334 |
| 2002/0045027 | A1 * | 4/2002 | Sawada et al. ........... | 428/141 |
| 2003/0065071 | A1 | 4/2003 | Scholten ................ | 524/136 |
| 2003/0109660 | A1 * | 6/2003 | Oda et al. ............... | 528/14 |
| 2005/0158537 | A1 * | 7/2005 | Aral et al. ............. | 428/332 |

FOREIGN PATENT DOCUMENTS

| | | |
|---|---|---|
| DE | 28 54 136 A1 | 7/1979 |
| EP | 0 492 545 | 3/1998 |
| EP | 0 897 950 | 7/1998 |
| EP | 0 897 950 | 2/1999 |
| EP | 1000969 | 11/1999 |
| EP | 1 110 993 | 6/2001 |
| WO | WO 96/25451 | 8/1996 |
| WO | WO 01/25326 | 4/2001 |
| WO | WO 01/49925 | 7/2001 |

OTHER PUBLICATIONS

Yuan, et al., "Surface Enrichment of Poly(trifluorovinyl ether)s in Polystyrene Blends", Macromolecules 2000, 33, pp. 4926-4931.
Guo, et al., "Surface characterization of blood compatible amphiphilic graft copolymers having uniform poly(ethylene oxide) side chains", Polymer 42 (2001) pp. 1017-1022.
Torstensson, et al., "Monomeric Surfactants for Surface Modification of Polymers", Macromolecules 1990, 23, pp. 126-132.
Wang, et al., "Surface Analysis of Poly(ether urethane) Blending Stearyl Poly(ethylene oxide) Coupling Polymer", Macromolecules 2000, 33, pp. 8472-8478.
Hester, et al., "Preparation of Protein-Resistant Surfaces on Poly(vinylidene flouride) Membranes via Surface Segregation", Macromolecules 1999, 32, pp. 1643-1650.
Walton, et al., "Creation of Stable Poly(ethylene oxide) Surfaces on Poly(methyl methacrylate) Using Blends of Branched and Linear Polymers", Macromolecules 1997, 30, pp. 6947-6956.
Anastasiadis, et al., "Smart Polymer Surfaces", Macromolecules 2003, 36, pp. 1994-1999.
Kim, et al., "Effect of PEO Grafts on the Surface Properties of PEO-Grafted PU/PS IPNs: AFM Study" Macromolecules 2003, 36, pp. 2867-2872.
Abstract JP9279010, "Polycarnonate Resin Composition and Molded Product Thereof", Publication Date Oct. 28, 1997.
Abstract JP6345432, "Production of Barium Titanate Powder", Publication Date Dec. 20, 1994.
International Search Report for PCT/US2004/042873. Mailed Mar. 31, 2005.
International Search Report for PCT/US2004/042715. Mailed Apr. 14, 2005.
Bajaj, et al. "Antistatic and Hydrophilic Synthetic Fibers: A Critique". J.M.S.-Rev. Macromol. Chem. Phys., C40,(2&3), 105-138 (2000).
JP2003176405. Publication Date Jun. 24, 2003. "Antistatic Polycarboante Resin Composition". Machine Translation and Abstract.

* cited by examiner

*Primary Examiner*—Jeffrey Wollschlager
(74) *Attorney, Agent, or Firm*—Cantor Colburn LLP

(57) ABSTRACT

A method for making a fog resistant thermoplastic article includes conditioning a thermoplastic article by exposing it to an aqueous environment sufficient to result in fog resistance.

16 Claims, No Drawings

METHOD FOR MAKING FOG RESISTANT THERMOPLASTIC ARTICLES AND ARTICLES MADE THEREFROM

FIELD OF THE INVENTION

A method for making fog resistant thermoplastic articles, and more specifically aromatic thermoplastic articles, without the use of an anti-fog coating is described herein.

BACKGROUND OF THE INVENTION

Aromatic thermoplastic polymers, including aromatic polycarbonate based compositions are known for their excellent properties in terms of transparency, heat resistance, and mechanical strength. Fogging of the surface of articles prepared from the thermoplastic polymers creates problems for many end-use applications, such as goggles/lenses or greenhouse panels, where the formation of condensed water beads on the surface thereby reducing transparency.

To reduce or eliminate fog on the surface of polycarbonate or other thermoplastic articles, anti-fog coatings have been developed. However, as the anti-fog coatings must be applied to the surface of the article, their use is less convenient and more expensive than having an anti-fog feature in the as-molded article.

The use of anti-fog additives for certain thermoplastics is known, for example, there are known anti-fog additives for polyethylene and poly(vinyl chloride). These additives include sorbitan esters, ethoxylated sorbitan esters, polyol esters and glycerol esters. Such additives present in the polyethylene and poly(vinyl chloride) material results in fog resistant articles made from such materials. Such additives allow for the elimination of anti-fog coatings. While these additives are known to be surface active and impart anti-fog properties to polyethylene and poly(vinyl chloride), they are unsuitable for polycarbonate and other aromatic thermoplastic polymers. These additives suffer from low thermal stability or are incompatible with the resin thereby preventing them from being effective anti-fog additives for aromatic thermoplastic polymers, especially polycarbonate.

Accordingly, although there are anti-fog coatings for polycarbonate and other aromatic thermoplastic polymers, there remains a need for anti-fog additives and/or methods of rendering such polymers fog resistant without the use of an anti-fog coating.

SUMMARY OF THE INVENTION

In one embodiment, a method for making a fog resistant thermoplastic article comprises exposing an aromatic thermoplastic polymer article to an aqueous environment sufficient to result in a fog resistant aromatic thermoplastic polymer article, wherein the fog resistant aromatic thermoplastic polymer article has a greater fog resistance when compared to the aromatic thermoplastic polymer article prior to exposing.

In another embodiment, a method for making a fog resistant thermoplastic article comprises blending an aromatic thermoplastic polymer and an ionic or a non-ionic anti-fog additive to form a blend; molding the blend to form a thermoplastic article; and exposing the thermoplastic article to an aqueous environment sufficient to provide a fog resistant thermoplastic article having an increase in fog resistance as compared to the thermoplastic article prior to exposing.

In yet another embodiment, a method for making a fog resistant thermoplastic article comprises exposing a thermoplastic article to an aqueous environment sufficient to result in a fog resistant thermoplastic article, wherein the fog resistant thermoplastic article has a greater fog resistance when compared to the thermoplastic article prior to exposing; and wherein the thermoplastic article comprises a composition comprising polycarbonate, an aromatic polycarbonate, a (co)polyestercarbonate, an aromatic (co)polyestercarbonate, blends thereof, or a combination comprising at least one of the foregoing polymers; and an ionic or non-ionic anti-fog additive.

DETAILED DESCRIPTION OF THE INVENTION

It has been surprisingly discovered that aromatic thermoplastic articles prepared from a blend of aromatic thermoplastic polymer and an anti-fog additive (ionic or nonionic) obtain a fog resistant surface after activation with a conditioning step. Such a conditioning step includes exposing the surface of the article to an aqueous environment sufficient to provide fog resistance to the article. Not wishing to be bound by theory, it is believed that conditioning brings the hydrophilic portion of the anti-fog additive to the surface of the article in response to the aqueous environment, thereby switching the additive orientation so the anti-fog (hydrophilic) portion of the additive is at the outermost surface. Although the additive orientation can reverse upon drying the surface, it is believed that subsequent exposure to an aqueous environment (including fogging conditions) brings the hydrophilic portion again to the outermost surface and the time for this to occur is shorter than the time required during the conditioning step. Therefore, after conditioning, a material becomes fog resistant where it was not prior to the conditioning step.

By "an increase in fog resistance" is meant that an article that has been exposed to the conditioning step as described herein takes a longer time to exhibit visible fog at the article surface under conditions of fog as compared to the article prior to the conditioning step. Conditioning by exposure to an aqueous environment provides the article with greater fog resistance than an unconditioned article.

The surface of the article is exposed to an aqueous environment effective to provide an increase in fog resistance as compared to an article that has not been conditioned. Any means of exposing the surface of the article to an aqueous environment that provides the article with an increased fog resistant property may be used as long as the anti-fog property is not compromised. Exposure to excess water may result in washing away of the anti-fog additive and a subsequent decrease in fog resistance. Accordingly, the exposure to the aqueous environment is preferably controlled to provide the desired increase in fog resistance. Non-limiting examples of exposing to an aqueous environment include exposing the article to water vapor, exposure to steam, immersion in aqueous liquid, spraying or misting with an aqueous liquid, and the like. Optionally, the conditioning step further includes drying the article after exposure to the aqueous environment.

Preferably the aqueous environment is water, including deionized and/or purified water, or optionally miscible blends of solvent and water, as long as the solvent does not detrimentally affect the fog resistant properties of the article or other desired properties such as transparency. Suitable solvents that are miscible with water include, for example, $C_1$-$C_6$ alkyl alcohols, and the like. Preferably the aqueous environment is liquid water or water vapor. A preferred water includes Milli-Q® deionized, purified water available from Millipore.

The thermoplastic polymer article is generally exposed to the aqueous environment for any amount of time effective to provide an increase in fog resistance. Suitable exposure to the aqueous environment includes, for example, about one minute to about 48 hours, preferably about 5 minutes to about 24 hours, even more preferably about 20 minutes to about 12 hours, and yet more preferably about 45 minutes to about 2 hours.

All ranges disclosed herein are inclusive and combinable.

By the term "halo" or "halogen" is meant, fluorine, chlorine, bromine, and iodine.

By the term "alkyl" is meant straight chain, branched, or cyclic alkyl groups.

By the term "haloalkyl" is meant an alkyl group as described previously comprising one or more halogen atoms substituting available hydrogen atoms up to perhalogenated substitution.

By the term "about" in combination with a number quantity is meant that the amount can differ depending on a particular embodiment and that it may be necessary for the person skilled in the art to do some limited experimentation to find the optimum amount.

The anti-fog additives that are suitable to provide a fog resistant article after conditioning include both ionic and non-ionic anti-fog additives that exhibit a balance of properties to provide the fog resistance. Suitable anti-fog additives are preferably thermally stable to processing temperatures of the thermoplastic polymers, especially aromatic thermoplastic polymers. The additive desirably has the ability to migrate to the surface of the article where it can provide the anti-fog property. It is known that more hydrophobic groups present in the additive, such as long chain alkyls or perfluorinated alkyls, enhance the additive's ability to migrate to the surface of the article. Although the additive should have a degree of hydrophobicity to allow for migration to the surface, the additive is also preferably hydrophilic enough to provide reduced surface tension of water that may be present at the surface of the article. The reduction in surface tension allows for the fog resistance at the surface of the article. The balance of hydrophobic and hydrophilic should also allow for the positioning of the hydrophilic moiety of the additive to be directed toward the surface of the article.

It has been found that certain compounds that are known surface seeking additives, including anti-static additives, may also possess the correct balance of properties described above to be suitable as the anti-fog additive. Not all anti-static compounds can function as the anti-fog additive as described herein as they may be too hydrophobic and cannot reduce the surface tension of water at the surface of the article sufficiently.

A convenient method has been developed to quickly and easily determine if an anti-static compound, or any other compound, can function as the anti-fog additive as described herein. The compound may first be tested as a coating on the surface of a thermoplastic article. If the compound provides good fog resistance as a coating under fogging conditions, it is then further tested to determine if it can provide fog resistance as an additive to the thermoplastic polymer. Testing the compound as a coating provides a quick and easy method to determine whether a compound has the potential to be an anti-fog additive without having to prepare multiple samples of compounded thermoplastic polymer blends followed by molding the samples into test specimens.

Suitable ionic anti-fog additives include, for example, sulfonic acid salts. Exemplary sulfonic acid salts may be expressed by the following formula:

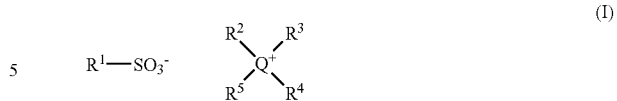

(I)

wherein Q indicates nitrogen or phosphorus; $R^1$ indicates a $C_1$-$C_{40}$ alkyl group, a $C_1$-$C_{40}$ haloalkyl group, a $C_6$-$C_{40}$ aryl group, a $(C_6$-$C_{12}$ aryl$)C_1$-$C_{40}$ alkyl group, or a $(C_1$-$C_{40}$ alkyl$)$ $C_6$-$C_{12}$ aryl group; and $R^2$, $R^3$, $R^4$ and $R^5$ each independently indicate a group selected from hydrogen atoms, a $C_1$-$C_{20}$ alkyl group, a $C_1$-$C_{20}$ hydroxyalkyl group, and a $C_6$-$C_{12}$ aryl group. Here, the term alkyl group includes linear, branched, and cyclic alkyl groups. Furthermore, such alkyl groups and aryl groups may be substituted by optional groups as described in U.S. Pat. No. 6,090,907 to Saito et al.

Examples of alkyl groups which may occur as $R^1$ include $C_1$-$C_{40}$ alkyl groups, for example, dodecyl groups, decyl groups, butyl groups and ethyl groups, and the like. Examples of aryl groups, (alkyl)aryl, or (aryl)alkyl groups include dodecylphenyl groups, phenyl groups, benzyl groups, phenethyl groups, tolyl groups and xylyl groups, etc. Preferred $R^1$ is a $(C_6$-$C_{12}$ aryl$)C_4$-$C_{40}$ alkyl group, more preferred is a $(C_6$ aryl$)C_4$-$C_{18}$ alkyl group, and most preferred is a $(C_6$ aryl$)C_6$-$C_{14}$ alkyl group wherein the sulfur is attached to the aryl. Nonlimiting examples of suitable sulfonates include trifluoromethyl sulfonate, perfluorinated n-butyl sulfonate, n-heptyl sulfonate, 4-dodecylbenzene sulfonate, and the like.

Examples of alkyl groups which may occur as $R^2$ through $R^5$ independently include $C_1$-$C_{20}$ alkyl groups, for example, methyl, ethyl, propyl, butyl, and octyl groups, and the like. Examples of aryl, (alkyl)aryl, or (aryl)alkyl groups include phenyl groups, benzyl groups, phenethyl groups, tolyl groups and xylyl groups, and the like. Examples of hydroxyalkyl groups include hydroxy methyl, hydroxy ethyl, hydroxy propyl, and the like. Preferably at least one of $R^2$ through $R^5$ is a $C_1$-$C_{20}$ hydroxyalkyl group.

Examples of desirable sulfonic acid phosphonium salts include tetraalkylphosphonium salts and trialkyl(hydroxyalkyl)phosphonium salts. Examples include tetraalkylphosphonium salts of dodecylsulfonic acid, and tetraalkylphosphonium salts of dodecylbenzenesulfonic acid, tetraalkylphosphonium salts of heptylsulfonic acid, combinations of the foregoing, and the like.

Examples of desirable sulfonic acid ammonium salts include tetraalkylammonium salts and trialkyl(hydroxyalkyl) ammonium salts. Examples include tetraalkylammonium salts of trifluoromethylsulfonic acid, tetraalkylammonium salts of perfluorobutylsulfonic acid, trialkyl(hydroxyethyl) ammonium salts of trifluoromethylsulfonic acid, trialkyl(hydroxyethyl)ammonium salts of perfluorobutylsulfonic acid, combinations of the foregoing, and the like.

It is also contemplated that compounds comprising bis (fluoroalkylsulfonyl)imides as disclosed in WO 01/49925 by 3M are suitable as the ionic anti-fog additive.

The ionic anti-fog additive may be present in the composition in amounts of about 0.1 to about 10 weight percent, preferably about 0.5 to about 8 weight percent, more preferably about 1 to about 7 weight percent, and still more preferably about 2 to about 5 weight percent based on the total weight of the composition.

Suitable non-ionic anti-fog additives include polysiloxane-polyether (co)polyethers, especially those compatible with polycarbonate. In general the copolymer can be described as having a siloxane backbone with attached one or more polyether groups. The polysiloxane may be substituted with one or more of hydrogen; $C_1$-$C_6$ alkyl such as methyl, ethyl, propyl, and the like; phenyl; vinyl; and $C_1$-$C_6$ alkoxy substituents. The polysiloxane backbone can be a random or block copolymer containing one or more substitutents including hydrogen; $C_1$-$C_6$ alkyl; phenyl; vinyl; or $C_1$-$C_6$ alkoxy substituents.

Non-limiting examples of suitable polysiloxane-polyether polymers include homopolymers of methyl-substituted siloxane, phenyl-substituted siloxane, random copolymers of methyl and phenyl substituted siloxane, block copolymers of methyl and phenyl substituted siloxane, branched polymers of methyl and phenyl substituted siloxane, star polymers of methyl and phenyl substituted siloxane, and the like. The polyether can be bonded to the ends of the polysiloxane backbone or grafted onto the polysiloxane.

In one embodiment the polysiloxane-polyether has the general formula

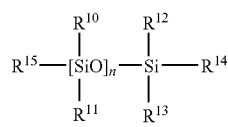

(II)

wherein n is about 3 to about 5000, preferably about 3 to about 100, and more preferably about 3 to about 40; $R^{10}$, $R^{11}$, $R^{12}$, $R^{13}$, $R^{14}$, $R^{15}$, are each independently hydrogen, a $C_1$-$C_{20}$ alkyl, $C_6$-$C_{12}$ aryl, ($C_1$-$C_{20}$ alkyl)$C_6$-$C_{12}$ aryl, ($C_6$-$C_{12}$ aryl)$C_1$-$C_{20}$ alkyl, $C_1$-$C_{20}$ alkoxy or polyether group and at least one of $R^{10}$, $R^{11}$, $R^{12}$, $R^{13}$, $R^{14}$, or $R^{15}$ is a polyether group. Where n is greater than 1, each $R^{10}$ and $R^{11}$ are independently chosen from hydrogen, a $C_1$-$C_{20}$ alkyl, $C_6$-$C_{12}$ aryl, ($C_1$-$C_{20}$ alkyl)$C_6$-$C_{12}$ aryl, ($C_6$-$C_{12}$ aryl)$C_1$-$C_{20}$ alkyl, $C_1$-$C_{20}$ alkoxy or polyether group. Non limiting examples of $R^{10}$-$R^{15}$ are methyl, ethyl, propyl, butyl, phenyl, 2-phenylpropyl, vinyl, methoxy, ethoxy, propoxy, or a polyoxyethylene/polyoxypropylene group. The polyether group may be, for example, polyethyleneoxide or polypropyleneoxide or combinations thereof, and may be terminated with hydroxyl or $C_1$-$C_{10}$ alkyl.

The polysiloxane-polyether compounds can be block copolymers (i.e. $R^{14}$ and/or $R^{15}$ are polyethers) or graft copolymers (i.e. any or all of $R^{10}$, $R^{11}$, $R^{12}$, and $R^{13}$ are polyether).

The molecular weight of the polyether may be about 100 to about 10000, preferably about 500 to about 5000, and more preferably about 500 to about 2500 grams/mole (g/mol).

The siloxane backbone can generally be a random or block (co)polymer substituted with methyl, phenyl, 2-phenylpropyl, hydrogen and alkoxy groups.

The non-ionic anti-fog additive may be present in the composition in amounts of about 0.1 to about 10 weight percent, preferably about 0.5 to about 8 weight percent, more preferably about 2 to about 7 weight percent, and still more preferably about 3 to about 6 weight percent based on the total weight of the composition.

Suitable aromatic thermoplastic polymers that may be used include aromatic polycarbonate, polyphenylene ether, aromatic polyester, polyphenylene ether/styrene blend, aromatic polyamide, polyethylene terephthalate, blends thereof, or a combination comprising at least one of the foregoing polymers. A preferred aromatic thermoplastic polymer includes aromatic polycarbonates.

The polycarbonate articles may be prepared from polycarbonate, including aromatic polycarbonate, a polyester, a (co) polyester carbonate, copolymers of aromatic polycarbonates, or blends thereof including blends with other thermoplastics resins.

Polycarbonate includes compositions having structural units of the formula (III):

(III)

in which greater than or equal to about 60 percent of the total number of R' groups are aromatic organic radicals and the balance thereof are aliphatic or alicyclic radicals. Preferably, R' is an aromatic organic radical and, more preferably, a radical of the formula (IV):

(IV)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative examples of radicals of this type are —O—, —S—, —S(O)—, —S(O)$_2$—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. The bridging radical $Y^1$ can be a hydrocarbon group or a saturated hydrocarbon group such as methylene, cyclohexylidene or isopropylidene. In another embodiment, zero atoms separate $A^1$ from $A^2$, instead a covalent bond links $A^1$ to $A^2$.

Polycarbonates, in general, can be manufactured by known processes, including interfacial reaction and melt polymerization. For example, polycarbonates can be produced by the interfacial reaction of dihydroxy compounds in which only one atom separates $A^1$ and $A^2$. As used herein, the term "dihydroxy compound" includes, for example, bisphenol compounds having general formula (V) as follows:

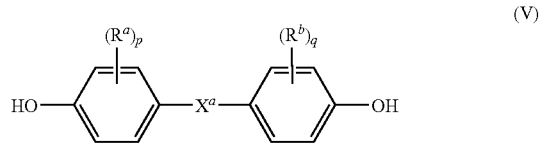

(V)

wherein $R^a$ and $R^b$ each independently represent hydrogen, a halogen atom, preferably bromine, or a monovalent hydrocarbon group; p and q are each independently integers from 0 to 4; and $X^a$ represents one of the groups of formula (VI):

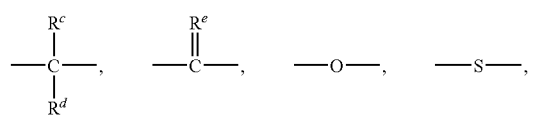

(VI)

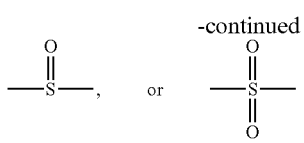

wherein $R^c$ and $R^d$ each independently represent a hydrogen atom or a monovalent linear or cyclic hydrocarbon group, and $R^e$ is a divalent hydrocarbon group, oxygen, or sulfur.

Examples of the types of bisphenol compounds that may be represented by formula (V) include the bis(hydroxyaryl)alkane series such as, 1,1-bis(4-hydroxyphenyl)methane; 1,1-bis(4-hydroxyphenyl)ethane, 2,2-bis(4-hydroxyphenyl)propane (or bisphenol A); 2,2-bis(3,5-dibromo-4-hydroxyphenyl)propane; 2,2-bis(3,5-dimethyl-4-hydroxyphenyl)propane; 2,2-bis(4-hydroxyphenyl)butane; 2,2-bis(4-hydroxyphenyl)octane; 1,1-bis(4-hydroxyphenyl) propane; 1,1-bis(4-hydroxyphenyl)n-butane; bis(4-hydroxyphenyl)phenylmethane; 2,2-bis(4-hydroxy-1-methylphenyl)propane; 1,1-bis(4-hydroxy-t-butylphenyl)propane; 2,2-bis(4-hydroxy-3-bromophenyl)propane; 1,1-bis(4-hydroxyphenyl)decane; 4,4-dihydroxydiphenyl ether; 4,4-thiodiphenol; 4,4-dihydroxy-3,3-dichlorodiphenyl ether; 4,4-dihydroxy-2,5-dihydroxydiphenyl ether; or the like; bis (hydroxyaryl)cycloalkane series such as, 1,1-bis(4-hydroxyphenyl)cyclopentane; 1,1-bis(4-hydroxyphenyl)cyclohexane; 1,1-bis(3,5-dimethyl-4-hydroxyphenyl)cyclohexane; 1,1-bis(4-hydroxyphenyl)cyclododecane; 1,1-bis(3,5-dimethyl-4-hydroxyphenyl)cyclododecane; 1,1-bis-(4-hydroxyphenyl)-3,3,5-trimethylcyclohexane; or the like, or combinations comprising at least one of the foregoing bisphenol compounds.

Other examples of bisphenol compounds that may be represented by formula (V) include those where Xa is —O—, —S—, —S(O)—, or —S(O)$_2$—, such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl) sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations comprising at least one of the foregoing bisphenol compounds.

Other dihydroxy compounds that may be utilized in the polycondensation of polycarbonate are represented by the formula (VII):

(VII)

wherein, $R^f$, is a halogen atom, a hydrocarbon group having 1 to 10 carbon atoms, or a halogen substituted hydrocarbon group; n is a value from 0 to 4. The halogen is preferably bromine. When n is at least 2, $R^f$ may be the same or different. Examples of compounds that may be represented by the formula (VII), are resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones, such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, or the like; or combinations comprising at least one of the foregoing compounds.

Bisphenol compounds such as 2,2,2',2'-tetrahydro-3,3,3',3'-tetramethyl-1,1'-spirobi-[IH-indene]-6,6'-diol represented by the following formula (VIII) may also be used as the dihydroxy compound:

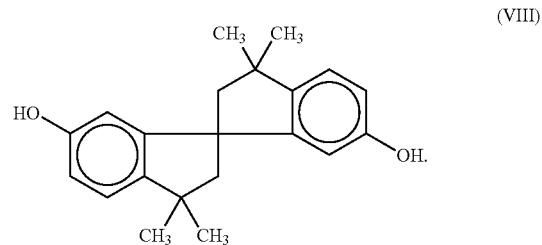

(VIII)

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl) carbonate, and di(naphthyl) carbonate. The preferred carbonate precursor for the interfacial reaction is carbonyl chloride.

Branched polycarbonate, as well as blends of linear polycarbonate and a branched polycarbonate may also be used. The branched polycarbonate may be prepared by adding a branching agent during polymerization. These branching agents may comprise polyfunctional organic compounds containing at least three functional groups, which may be hydroxyl, carboxyl, carboxylic anhydride, haloformyl, and combinations comprising at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) α,α-dimethyl benzyl)phenol), 4-chloroformyl phthalic anhydride, trimesic acid, benzophenone tetracarboxylic acid, or the like, or combinations comprising at least one of the foregoing branching agents. The branching agents may be added at a level of about 0.05 to about 2.0 weight percent (wt %), based upon the total weight of the polycarbonate. Branching agents and procedures for making branched polycarbonates are described in U.S. Pat. Nos. 3,635,895 and 4,001,184.

All types of polycarbonate end groups are contemplated as being useful in the polycarbonate composition. Some examples of common polycarbonate end groups are phenol, p-cumylphenol (PCP) and t-butylphenol.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, diphenyl carbonate, diethyl carbonate, dimethyl carbonate, dibutyl carbonate, dicyclohexyl carbonate, bis(o methoxyphenyl) carbonate (bis(methylsalicyl)carbonate or BMSC) or the like, or combinations comprising at least one of the foregoing carbonic acid diesters. Preferred carbonic acid diesters are diphenyl carbonate and BMSC.

Also suitable are (co)polyester carbonates, also known as (co)polyester-polycarbonates or polyestercarbonates, that is, resins which contain, in addition to recurring polycarbonate chain units of the formula (IX):

(IX)

wherein D is a divalent radical of a dihydroxy compound employed in the polymerization reaction, the dihydroxycompound as described previously; repeating or recurring carboxylate units, for example of the formula (X):

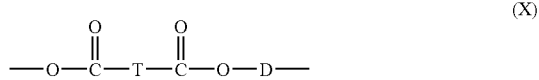

(X)

wherein D is as defined above and T is an aromatic radical such as phenylene, naphthylene, biphenylene, substituted phenylene and the like; a divalent aliphatic-aromatic hydrocarbon radical such as an alkaryl or alkaryl radical; or two or more aromatic groups connected through such aromatic linkages which are known in the art.

The copolyester-polycarbonate resins are also prepared by interfacial polymerization technique, well known to those skilled in the art (see, for example, U.S. Pat. Nos. 3,169,121 and 4,487,896).

Examples of dicarboxylic acids include isophthalic acid, terephthalic acid and α, ω aliphatic di-acids with 6-18 carbon atoms. Preferred (co)polyestercarbonates are those of isophthalic, terephthalic acid and resorcinol with or without BPA. In general, any dicarboxylic acid used in the preparation of linear polyesters may be utilized in the preparation of the polyestercarbonate resins. Generally, the dicarboxylic acids which may be utilized includes aliphatic dicarboxylic acids, aromatic dicarboxylic acids, and aliphatic aromatic dicarboxylic acids. These acids are well known and are disclosed, for example, in U.S. Pat. No. 3,169,121. Mixtures of dicarboxylic acids may be employed. Preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of the acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

Blends of PC with other compatible polymers may also be used in the present compositions. Examples of such polymers include polybutylene terephtalate and butadiene styrene rubbers like MBS rubber. The ratio of the other compatible polymers to PC may be up to 50:50, or greater.

The thermoplastic composition may also comprise various optional components, including UV absorbing agents, phosphorous type stabilizers as oxidation inhibitors, hindered phenol type oxidation inhibitors, epoxy type stabilizers and sulphur type stabilizers, etc.

Any ultraviolet absorbing agent customarily used in resin compositions may be used as the above mentioned ultraviolet absorbing agent. For example, benzotriazole type ultraviolet absorbing agents, benzophenone type ultraviolet absorbing agents or salicylate type ultraviolet absorbing agents, etc., may be used. Examples of benzotriazole type ultraviolet absorbing agents include 2-(2'-hydroxy-5'-methylphenyl) benzotriazole, 2-(2'-hydroxy-5'-t-butylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3', 5'-di-amylbutylphenyl)benzotriazole, 2-(2'-hydroxy-3'-dodecyl-5'-methylphenyl)benzotriazole, 2-(2'-hydroxy-3',5'-dicumylphenyl)benzotriazole and 2,2'-methylenebis[4-(1,1, 3,3-tetramethylbutyl)-6-(2H-benzotriazol-2-yl)phenol], etc. For example, a benzotriazole type ultraviolet absorbing agent is marketed by American Cyanamid Co. as UV5411. Furthermore, a benzophenone type ultraviolet absorbing agent is marketed by American Cyanamid Co. as UV531. Examples of salicylate type ultraviolet absorbing agents include phenyl salicylate, p-t-butylphenyl salicylate and p-octylphenyl salicylate, etc.

Examples of phosphorous type stabilizers comprise triphenyl phosphite, diphenylnonyl phosphite, tris(2,4-di-t-butylphenyl) phosphite, trisnonylphenyl phosphite, diphenylisooctyl phosphite, 2,2'-methylenebis (4,6-di-t-butylphenyl) octyl phosphite, diphenylisodecyl phosphite, diphenylmono (tridecyl) phosphite, 2,2'-ethylidenebis(4,6-di-t-butylphenol) fluorophosphite, phenyldiisodecyl phosphite, phenyldi(tridecyl) phosphite, tris(2-ethylhexyl) phosphite, tris(isodecyl) phosphite, tris(tridecyl) phosphite, dibutyl hydrogenphosphite, trilauryl trithiophosphite, tetrakis(2,4-di-t-butylphenyl)4,4'-biphenylene diphosphite, 4,4'-isopropylidenediphenol alkyl ($C_{12}$-$C_{15}$) phosphites, 4,4'-butylidenebis(3-methyl-6-t-butylphenyl)ditridecyl phosphite, bis(2,4-di-t-butylphenyl) pentaerythritol diphosphite, bis(2,6-di-t-butyl-4-methylphenyl) pentaerythritol diphosphite, bis (nonylphenyl)pentaerythritol diphosphite, distearyl-pentaerythritol diphosphite, phenyl-bisphenol A pentaerythritol diphosphite, tetraphenyldipropylene glycol diphosphite, 1,1,3-tris (2-methyl-4-di-tridecylphosphite-5-t-butylphenyl)butane and 3,4,5,6-dibenzo-1,2-oxaphosphan-2-oxide, and the like. Available commercial products include Adekastab PEP-36, PEP-24, PEP-4C and PEP-8 (all trademarks, manufactured by Asahi Denka Kogyo K.K.), Irgafos 168 (trademark, manufactured by Ciba Specialty Chemicals.), Sandostab P-EPQ (trademark, manufactured by Clariant), Chelex L (trademark, manufactured by Sakai Kagaku Kogyo K.K.), 3P2S (trademark, manufactured by Ihara Chemical Kogyo K.K.), Mark 329K and Mark P (both trademarks, manufactured by Asahi Denka Kogyo K.K.) and Weston 618 (trademark, manufactured by Sanko Kagaku K.K.).

Examples of hindered phenol type oxidation inhibitors include n-octadecyl-3-(3',5'-di-t-butyl-4-hydroxyphenyl) propionate, 2,6-di-t-butyl-4-hydroxymethylphenol, 2,2'-methylenebis (4-methyl-6-t-butylphenol) and pentaerythritol-tetrakis[3-(3,5-di-t-butyl-4-hydroxyphenyl)propionate, and the like.

Examples of epoxy type stabilizers include epoxidized soybean oil, epoxidized linseed oil, phenylglycidyl ether, allylglycidyl ether and 3,4-epoxycyclohexylmethyl-3',4'-epoxycyclohexane carboxylate, and the like.

Other customary additives may be added to all of the resin compositions at the time of mixing or molding of the resin in amounts as necessary which do not have any deleterious effect on physical properties. For example, coloring agents (pigments or dyes), reinforcing agents (glass fibers, carbon fibers, etc.), fillers (carbon black, silica, titanium oxide, etc.), heat-resistant agents, oxidation inhibitors, weather-proofing agents, lubricants, mold release agents, plasticizer, flame retarding agents and fluidity enhancing agents, etc., may be added. Furthermore, dyes may be added in order to ameliorate yellowness in the blue direction.

As to the method of preparing the present compositions conventional techniques using standard equipment can be used without any particular limitation, e.g. melt mixing optionally using small amounts of solvents. The components of the composition can be mixed in any order. Extruders, Banbury mixers, rollers and kneaders etc. operated batchwise or continuously are examples of suitable apparatus. The extruded material can be pelletized and dried prior to molding or used directly in the molding process without pelletization or isolation.

The compositions may be converted to articles using common thermoplastic processes such as film and sheet extrusion, injection molding, gas-assist injection molding, extrusion molding, compression molding and blow molding. Film and sheet extrusion processes may include and are not limited to melt casting, blown film extrusion and calendaring. Co-extrusion and lamination processes may be employed to form composite multi-layer films or sheets. Single or multiple layers of coatings may further be applied to the single or multilayer substrates to impart additional properties such as scratch resistance, ultra violet light resistance, aesthetic appeal, etc. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt or roll followed by removal of the solvent.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The compositions may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:
1. Providing a single or multi-layer thermoplastic substrate having optionally one or more colors on the surface, for instance, using screen printing or a transfer dye
2. Conforming the substrate to a mold configuration such as by forming and trimming a substrate into a three dimensional shape and fitting the substrate into a mold having a surface which matches the three dimensional shape of the substrate.
3. Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

Accordingly, another embodiment relates to articles, sheets and films prepared from the compositions above. The aromatic thermoplastic polymer sheets, films, etc. can be conditioned to provide fog resistance by the conditioning step described previously. Alternatively, the sheets and films may further be processed into final products which are then conditioned to result in a fog resistance article. Preferred applications of the thermoplastic compositions are for goggles, lenses, greenhouse panels, automotive headlamp lenses, and the like.

All cited patents, patent applications, and other references are incorporated herein by reference in their entirety. The invention is further illustrated by the following non-limiting examples.

EXAMPLES

Initial Determination of Potential Anti-Fog Additives from Coatings of Anti-Static Compounds The following anti-static additives were obtained from 3M and a coating of these materials was made on a polycarbonate sheet (Blendex PC 175 available from GE Plastics) by melting the salts and applying a thin layer onto a transparent polycarbonate plaque. Liquid salts were spread directly onto the polycarbonate. These coatings were screened for anti-fog properties by holding the plaque (coated side down) over a beaker of water at 50° C. and recording the time until visible fog appeared on the plaque.

The anti-fog test was carried out using an IKAMAG-REB oil bath heater with an IKATRON-ETS temperature meter heated to 60° C. In the oil bath hangs a 250 ml beaker filled with 200 ml MilliQ® water and is held at a constant temperature of 50° C.±1° C. The temperature of the water was measured with a Kane-May KM330 temperature meter. The sample to be tested is laid on the top of the beaker and the time until a visible mist of water condensate appears on the plaque is measured. Results are reported in seconds. Longer fog free times indicate better anti-fog performance.

An anti-static additive was judged to be effective for anti-fog if the fog free time was at least 20 seconds, but preferably more than 60 seconds (Examples 1 and 2). Those additives that failed to provide a fog free time of at least 20 seconds are listed as comparative examples (CE 1-7). For reference, an uncoated piece of polycarbonate was also measured. These results clearly show that only a subset of these salts is effective for anti-fog when evaluated as a coating (Table 1).

TABLE 1

3M anti-static additives screened for anti-fog (as a coating).

| Example | Tradename of anti-static | Chemical structure of anti-static | Fog free time as coating (seconds) |
|---|---|---|---|
| 1 | L-16176 | $C_8H_{17}N(CH_3)_2(CH_2CH_2OH)^+\,{}^-O_3SCF_3$ | >60 |
| 2 | L-18357 | $C_8H_{17}N(CH_3)_2(CH_2CH_2OH)^+\,{}^-O_3SC_4F_9$ | >60 |
| CE 1 | | none | <1 |
| CE 2 | L-1858 | $C_8H_{17}N(CH_3)_2(CH_2CH_2OH)^+\,{}^-N(SO_2SCF_3)$ | 11 |
| CE 3 | L-18360 | $(CH_3CH_2)_4N^+\,{}^-O_3SCF_3$ | 6 |
| CE 4 | L-18362 | $(C_4H_9)_4N^+\,{}^-O_3SCF_3$ | 3 |
| CE 5 | L-18359 | $(CH_3CH_2)_4N^+\,{}^-N(SO_2SCF_3)$ | <1 |
| CE 6 | L-18361 | $(C_4H_9)_3N^+CH_3\,{}^-O_3SC_4F_9$ | <1 |
| CE 7 | L-18364 | $(C_4H_9)_4N^+\,{}^-N(SO_2CF_3)_2$ | <1 |

From Table 1, it is apparent that an anti-fog additive can contain fluorine or other hydrophobic constituents and still be suitable for anti-fog. However, if the additive is too hydrophobic, then it cannot function effectively as an anti-fog material. It is believed that if the additive is too hydrophobic it cannot spread the water bead across the surface or it cannot dissolve in the water bead and reduce the surface tension of the water. Such an effect is shown in Table 2 where a perfluorinated material (more hydrophobic) is not found to be anti-fog while its non-fluorinated counterpart is.

TABLE 2

Comparison of perfluorinated and aliphatic tails on anti-fog properties.

| Example | Tradename | Additive | Source | Water solubility | Fog free time as coating (s) |
|---|---|---|---|---|---|
| 3 | None | $H_3C(CH_2)_3SO_3^-\,{}^+P(C_4H_9)_4$ | Synthesized | Soluble | 22 |
| CE 8 | Zonyl FASP-1 | $F_3C(CF_2)_3SO_3^-\,{}^+P(C_4H_9)_4$ | DuPont | 830 mg/L | <1 |

Initial Determination of Potential Anti-Fog Additives from Coatings of Other Surface-Active Materials:

In addition to these examples, other surface-active materials (not exclusively designed as anti-static additives) were screened for their potential to be anti-fog additives for polycarbonate as shown in Table 3.

TABLE 3

Various salts and nonionic surfactants which were found suitable for anti-fog when screened as a coating.

| Example | Additive | Tradename | Source | Fog free time as coating (seconds) |
|---|---|---|---|---|
| 4 | $H_3C(CH_2)_6SO_3^-\,{}^+P(C_4H_9)_4$ | — | Synthesized | >60 |
| 5 | $H_3C(CH_2)_{11}(C_6H_4)SO_3^-\,{}^+P(C_4H_9)_4$ | EPA-202 | Takemoto | >60 |
| 6 | Fluorinated ethylene glycol copolymer | FluorN 561 | Cytonex | >60 |
| 7 | Fluorinated ethylene glycol copolymer | FluorN 562 | Cytonex | >60 |
| 8 | triglyceryl monooleate + sorbitan monooleate ethoxylate | Glycolube AFA-1 | Lonza | >60 |
| 9 | Hydroxyl functionalized dendrimer | | DSM | >60 |
| 10 | Poly(ethylene oxide) (PEO) functionalized dendrimer | | DSM | >60 |
| 11 | Polydimethylsiloxane-Poly(ethylene oxide) (PDMS-PEO) copolymers | SF1188A; SF1388; SF1488 | GE Silicones | >60 |
| 12 | Poly(ethylene oxide)-block-poly(propylene oxide)-block- | | Aldrich | >60 |

TABLE 3-continued

Various salts and nonionic surfactants which were found suitable for anti-fog when screened as a coating.

| Example | Additive | Tradename | Source | Fog free time as coating (seconds) |
|---------|----------|-----------|--------|------------------------------------|
| 13 | poly(ethylene oxide) copolymers Poly(propylene oxide)-block-poly(ethylene oxide)-block-poly(propylene oxide) copolymers | | Aldrich | >60 |
| CE 9 | none, uncoated polycarbonate | — | — | <1 |
| CE 10 | Perfluoropolyethers | Galden HT270 | FenS Chemicals | 15 |

Table 3 illustrates the wide variety of materials that meet the initial criteria for an anti-fog additive for polycarbonate in that they have some mechanism for surface activity and, as coatings, are excellent for anti-fog. The counter example again shows that some perfluorinated materials are not as suitable for anti-fog as they may be too hydrophobic to provide fog resistance.

Determination of Anti-Fog Additives from Blends of Polycarbonate:

Those anti-static additives or surface-active materials that were proven to have potential for anti-fog were then compounded with polycarbonate to determine compatibility with polycarbonate, transparency, surface activity, and anti-fog properties as an additive rather than a coating. Compounding with polycarbonate was done at loadings between 1 and 5 weight % of the additive. Typical polycarbonate stabilizers, such as Irgafos 168 from Ciba Specialty Chemicals (0.036 weight %), and Irganox 1076 from Ciba Specialty Chemicals (0.02 weight %), were added to the formulation, but a mold release additive was not used. Plaques were injection molded at 300° C. using injection speeds of 15 and 35 seconds. Plaques used for surface measurements were wrapped in aluminum foil to protect the surface.

The polycarbonate blends were evaluated on the following criteria, surface activity, transparency, and fog free time, both before and after conditioning. Hot fog tests were performed as described for the coatings. Transparency was determined by visual inspection. Surface activity was determined by X-ray Photo-electron Spectroscopy (XPS), which measures what atoms are present at the surface of a sample, including sulfur (S), oxygen (O), and fluorine (F). Penetration depth is typically 2-10 nanometers. The presence of S, O, F indicate the presence on the surface of the sample of surface active compounds. Samples having the presence of such atoms are noted in the table with a "yes" under the surface activity column.

Table 4 shows the results of anti-fog additives blended with polycarbonate. While all the additives had the potential to be suitable for anti-fog as judged from their performance as coatings, not all retained the transparency of polycarbonate or were sufficiently surface active. Of the additives that were transparent and surface active, none showed improvement in the fog free time prior to conditioning. Therefore, conditioning the molded blends by exposing the surface to aqueous water or to hot water vapors activated the anti-fog properties.

Conditioning to improve anti-fog performance was performed by either placing the plaque over a beaker containing 50° C. water for 45 minutes or by placing ultrapure (MilliQ® available from Millipore) water drops on the surface of the plaque. In either case, the sample was allowed to dry overnight prior to measuring the fog free time. As a control, an unmodified polycarbonate plaque was conditioned and no improvement in the fog free time was found (Comparative Example 11, CE11).

TABLE 4

Results of compounding additives with polycarbonate.

| Example | Additive | Wt % | Transparency | Surface Activity | Fog Free Time (s) | Cond. Fog Free time (s) |
|---------|----------|------|--------------|------------------|-------------------|--------------------------|
| 14 | $C_8H_{17}N(CH_3)_2(CH_2CH_2OH)^+{}^-O_3SCF_3$ | 2.67 | Yes | Yes | 2 | 20 |
| 15 | $C_8H_{17}N(CH_3)_2(CH_2CH_2OH)^+{}^-O_3SC_4F_9$ | 1.67 | Yes | Yes | 1 | >60 |
| 16 | $H_3C(CH_2)_6SO_3{}^-{}^+P(C_4H_9)_4$ | 2 | Yes | Yes | 2 | 16 |
| 17 | $H_3C(CH_2)_{11}(C_6H_4)SO_3{}^-{}^+P(C_4H_9)_4$ (EPA-202) | 3 | Yes | Yes | 3 | >60 |
| 18 | $H_3C(CH_2)_{11}(C_6H_4)SO_3{}^-{}^+P(C_4H_9)_4$ (EPA-202) | 5 | Yes | Yes | 1 | >60 |
| 19 | PDMS-PEO | 5 | Yes | Yes | 1 | 10 |
| CE 11 | None | N/A | Yes | N/A | <1 | <1 |
| CE 12 | Fluorinated ethylene glycol copolymer (Cytonex FluorN 562) | 3 | Yes | No | N/A | N/A |
| CE 13 | $H_3C(CH_2)_3SO_3{}^-{}^+P(C_4H_9)_4$ | 0.5 | Yes | No | N/A | N/A |

TABLE 4-continued

Results of compounding additives with polycarbonate.

| Example | Additive | Wt % | Transparency | Surface Activity | Fog Free Time (s) | Cond. Fog Free time (s) |
|---|---|---|---|---|---|---|
| CE 14 | triglyceryl monooleate + sorbitan monooleate ethoxylate (Glycolube AFA-1) | 5 | Not extrudable | N/A | N/A | N/A |
| CE 15 | Hydroxyl functionalized dendrimer | 5 | Not extrudable | N/A | N/A | N/A |
| CE 16 | PEO functionalized dendrimer | 3 | Yes | No | N/A | N/A |

The results in Table 4 show the value of using conditioning to activate anti-fog performance in transparent polycarbonate blends containing an anti-fog surface active additive.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for making a fog resistant thermoplastic article, comprising:
   blending an aromatic thermoplastic polymer and an ionic anti-fog additive to form a blend;
   molding the blend to form an aromatic thermoplastic polymer article; and
   exposing the aromatic thermoplastic polymer article to an aqueous environment sufficient to result in a fog resistant aromatic thermoplastic polymer article,
   wherein the exposing comprises exposing to steam, immersing in water, spraying with water, misting with water, or combinations comprising at least one of the foregoing;
   wherein, without adding an anti-fog coating to the aromatic thermoplastic polymer article, the fog resistant aromatic thermoplastic polymer article has a greater fog resistance when compared to the aromatic thermoplastic polymer article prior to exposing; and
   wherein the exposing is performed for greater than or equal to about 20 minutes.

2. The method of claim 1, wherein the exposing is performed for greater than or equal to about 45 minutes.

3. The method of claim 1, wherein the aromatic thermoplastic polymer article comprises a composition comprising aromatic polycarbonate, polyphenylene ether, aromatic polyester, polyphenylene ether/styrene blend, aromatic polyamide, polyethylene terephthalate, blends thereof, or a combination comprising at least one of the foregoing polymers.

4. The method of claim 1, wherein the aromatic thermoplastic polymer article comprises a composition comprising polycarbonate, an aromatic polycarbonate, a (co)polyestercarbonate, an aromatic (co)polyestercarbonate, blends thereof, or a combination comprising at least one of the foregoing polymers.

5. The method of claim 1, wherein the ionic anti-fog additive is a sulfonic acid salt.

6. The method of claim 5, wherein the sulfonic acid salt is according to the formula:

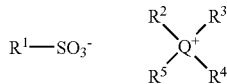

wherein Q is nitrogen or phosphorus; $R^1$ is a $C_1$-$C_{40}$ alkyl group, a $C_1$-$C_{40}$ haloalkyl group, a $C_6$-$C_{40}$ aryl group, a ($C_6$-$C_{12}$ aryl)$C_1$-$C_{40}$ alkyl group, or a ($C_1$-$C_{40}$ alkyl)$C_6$-$C_{12}$ aryl group; and $R^2$, $R^3$, $R^4$ and $R^5$ are each independently hydrogen, a $C_1$-$C_{20}$ alkyl group, a $C_1$-$C_{20}$ hydroxyalkyl group, or a $C_6$-$C_{12}$ aryl group.

7. The method of claim 5, wherein the sulfonic acid salt is a tetraalkyl ammonium salt of a sulfonic acid, a trialkyl(hydroxyalkyl)ammonium salt of a sulfonic acid, tetraalkyl phosphonium salt of a sulfonic acid, a trialkyl(hydroxyalkyl) phosphonum salt of a sulfonic acid, or combinations comprising at least one of the foregoing sulfonic acid salts.

8. The method of claim 1, wherein the fog resistant aromatic thermoplastic polymer article is free of an anti-fog coating.

9. A method for making a fog resistant thermoplastic article, comprising:
   blending a thermoplastic polymer and an ionic or a non-ionic anti-fog additive to form a blend;
   molding the blend to form a thermoplastic article; and
   exposing the thermoplastic article to an aqueous environment sufficient to result in a fog resistant thermoplastic article,
   wherein the exposing comprises exposing to steam, immersing in water, spraying with water, misting with water, or combinations comprising at least one of the foregoing; and
   wherein, without adding an anti-fog coating to the thermoplastic article, the fog resistant thermoplastic article has a greater fog resistance when compared to the thermoplastic article prior to exposing;
   wherein the non-ionic anti-fog additive is a polysiloxane-polyether copolymer, a poly(propylene glycol)-poly(ethylene glycol)-poly(propylene glycol), or a poly(ethylene glycol)-poly(propylene glycol)-poly(ethylene glycol); and
   wherein the thermoplastic polymer comprises polycarbonate, an aromatic polycarbonate, a (co)polyestercarbonate, an aromatic (co)polyestercarbonate, blends thereof, or a combination comprising at least one of the foregoing polymers; and wherein the exposing is performed for greater than or equal to about 20 minutes.

10. A method for making a fog resistant thermoplastic article, comprising:

blending an aromatic thermoplastic polymer and an ionic or non-ionic anti-fog additive to form a blend;

molding the blend to form an aromatic thermoplastic polymer article; and exposing the aromatic thermoplastic polymer article to an aqueous environment sufficient to result in a fog resistant aromatic thermoplastic polymer article, wherein the exposing comprises exposing to steam, immersing in water, spraying with water, misting with water, or combinations comprising at least one of the foregoing; and wherein, without adding an anti-fog coating to the aromatic thermoplastic polymer article, the fog resistant aromatic thermoplastic polymer article has a greater fog resistance when compared to the aromatic thermoplastic polymer article prior to exposing;

wherein the non-ionic anti-fog additive is a polysiloxane-polyether copolymer, a poly(propylene glycol)-poly(ethylene glycol)-poly(propylene glycol), or a poly(ethylene glycol)-poly(propylene glycol)-poly(ethylene glycol); and wherein the aromatic thermoplastic polymer comprises polyphenylene ether, aromatic polyester, polyphenylene ether/styrene blend, aromatic polyamide, polyethylene terephthalate, blends thereof, or a combination comprising at least one of the foregoing polymers; and wherein the exposing is performed for greater than or equal to about 20 minutes.

11. The method of claim 10, wherein the ionic or non-ionic anti-fog additive is present in an amount of about 0.1 to about 10 weight percent based on the total weight of the composition.

12. The method of claim 10, wherein the polysiloxane-polyether copolymer comprises a backbone of a methyl-substituted siloxane, phenyl-substituted siloxane, random copolymer of methyl and phenyl substituted siloxane, block copolymer of methyl and phenyl substituted siloxane, branched polymer of methyl and phenyl substituted siloxane, or star polymer of methyl and phenyl substituted siloxane; and wherein polyether is bonded to one or more ends of the siloxane backbone, grafted onto the siloxane, or both.

13. The method of claim 10, wherein the polysiloxane-polyether copolymer is according to the formula

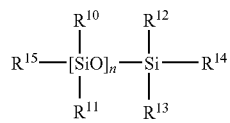

wherein n is about 3 to about 5000; and $R^{10}$, $R^{11}$, $R^{12}$, $R^{13}$, $R^{14}$, $R^{15}$ are each independently hydrogen, a $C_1$-$C_{20}$ alkyl group, a $C_6$-$C_{12}$ aryl group, a $(C_1$-$C_{20}$ alkyl$)C_6$-$C_{12}$ aryl group, a $(C_6$-$C_{12}$ aryl$)C_1$-$C_{20}$ alkyl group, a $C_1$-$C_{20}$ alkoxy, or polyether group, with the proviso that at least one of $R^{10}$, $R^{11}$, $R^{12}$, $R^{13}$, $R^{14}$, or $R^{15}$ is a polyether group.

14. A fog resistant article prepared from the method of claim 1.

15. A fog resistant article prepared from the method of claim 9.

16. A fog resistant article prepared from the method of claim 10.

* * * * *